US009562295B2

(12) United States Patent
McDugle

(10) Patent No.: US 9,562,295 B2
(45) Date of Patent: Feb. 7, 2017

(54) COMBUSTION ENGINE AIR SUPPLY

(76) Inventor: Brian McDugle, Anacortes, WA (US)

( * ) Notice: Subject to any disclaimer, the term of this patent is extended or adjusted under 35 U.S.C. 154(b) by 1049 days.

(21) Appl. No.: 13/019,387

(22) Filed: Feb. 2, 2011

(65) Prior Publication Data

US 2012/0118727 A1     May 17, 2012

Related U.S. Application Data

(60) Provisional application No. 61/300,561, filed on Feb. 2, 2010.

(51) Int. Cl.
| | | |
|---|---|---|
| *C25B 1/04* | (2006.01) | |
| *C25B 15/08* | (2006.01) | |
| *C01B 13/02* | (2006.01) | |
| *F02M 25/12* | (2006.01) | |

(52) U.S. Cl.
CPC ........... *C25B 15/08* (2013.01); *C01B 13/0207* (2013.01); *C25B 1/04* (2013.01); *F02M 25/12* (2013.01); *Y02E 60/366* (2013.01); *Y02T 10/121* (2013.01)

(58) Field of Classification Search
CPC ...................................................... C25B 1/04
USPC ....................................................... 204/278
See application file for complete search history.

(56) References Cited

U.S. PATENT DOCUMENTS

| | | | |
|---|---|---|---|
| 3,669,749 A | 6/1972 | Allen et al. | |
| 4,023,545 A * | 5/1977 | Mosher et al. | .................... 123/3 |
| 4,132,619 A | 1/1979 | Klein et al. | |
| 4,394,230 A | 7/1983 | Puharich | |
| 4,492,741 A | 1/1985 | Struthers | |
| 5,879,521 A | 3/1999 | Shimamune et al. | |
| 6,311,648 B1 | 11/2001 | Larocque | |
| 6,866,756 B2 | 3/2005 | Klein | |
| 2002/0051898 A1* | 5/2002 | Moulthrop et al. | ............ 429/17 |
| 2002/0166546 A1* | 11/2002 | Andrews et al. | ............. 123/556 |
| 2005/0126924 A1* | 6/2005 | Gomez | ......................... 205/637 |
| 2007/0074680 A1* | 4/2007 | Ross | ............................. 123/1 A |
| 2009/0283418 A1* | 11/2009 | Martin et al. | ................. 205/464 |
| 2009/0320807 A1* | 12/2009 | Cerny et al. | .................. 123/527 |
| 2010/0170454 A1* | 7/2010 | McBride et al. | ................. 123/3 |
| 2010/0300381 A1* | 12/2010 | Harper | .............................. 123/3 |
| 2011/0006544 A1* | 1/2011 | Geurts | ......................... 290/1 A |

OTHER PUBLICATIONS

Phillips, Egon, "Could the heat from car exhaust make more efficient electrolysis to generate hydrogen?," The Naked Scientists Forum, Dec. 2, 2009, www.thenakedscientists.com/forum.
Blackburn, Nicky, "Forget gas, fill your tanks with water," Israeli Researcher, Sep. 17, 2006, www.israel21c.org.

* cited by examiner

*Primary Examiner* — Bryan D. Ripa
(74) *Attorney, Agent, or Firm* — Schacht Law Office, Inc.; Dwayne Rogge

(57) ABSTRACT

This disclosure relates to a dry cell system for separating water into hydrogen and oxygen in combination with catalytic-type chemicals and materials. The separated hydrogen/oxygen are provided into the air intake system of an internal combustion engine and used therein to greatly improve the operation of said internal combustion engine, both in regards to fuel consumption as well as detrimental exhaust products.

9 Claims, 3 Drawing Sheets

COMBUSTION ENGINE AIR SUPPLY

RELATED APPLICATIONS

This application claims priority benefit of U.S. Ser. No. 61/300,561, filed Feb. 2, 2010.

BACKGROUND OF THE DISCLOSURE

Field of the Disclosure

This disclosure relates to a dry cell system for separating water into hydrogen and oxygen in combination with catalytic-type chemicals and materials. The separated hydrogen/oxygen are provided into the air intake system of an internal combustion engine and used therein to greatly improve the operation of said internal combustion engine, both in regards to fuel consumption as well as detrimental exhaust products.

SUMMARY OF THE DISCLOSURE

As a dry cell system, the reservoir, including the electrolyte and the water reservoir, is kept separate from the hydrogen generator. As the gas is created in the hydrogen generator, it is expelled therefrom and utilized in the engine almost immediately. This increases safety, among other benefits, as there is not an accumulated quantity of hydrogen gas or oxygen gas, which is potentially explosive in this environment.

In most wet cell HHO generators, the distance between the anode and cathode is approximately 0.125", and in dry cell generators the distance between plates is approximately 0.025". Thus, it follows that a dry cell generator will also take up less space, although the gas created must either be used or be removed for storage, as there is no region within the generator for storage. Furthermore, the system disclosed herein operates without any substantial pressure differential between the produced gas and the surrounding atmosphere. A venture effect is utilized to draw off the HHO gas, and thus the HHO gas need not pass through any potentially dangerous pump.

The disclosed generator has also proven to operate at a relatively low temperature, less than 212° F.

In one form, electrolyte chemicals, including boron in the form of boric acid, which may be combined with potassium hydroxide as a catalyst, have been found to greatly increase the HHO production in the HHO generator. An unexpected result has been found in that the boron decreases the foaming effect of the dry cell, which increases the efficiency of the stabilization tank. In addition, the boric acid decreases the freezing temperature of the water electrolyte, acts as a refrigerant, and functions as an electric conductivity stabilizer. The use of potassium hydroxide (KOH) has been found to be exemplary in several embodiments as a catalyst in the disclosed system.

DESCRIPTION OF THE PREFERRED EMBODIMENTS

Tests have shown that the disclosed embodiments increase the gas efficiency and lower carbon emissions in both gas and diesel engines.

Figure 1:
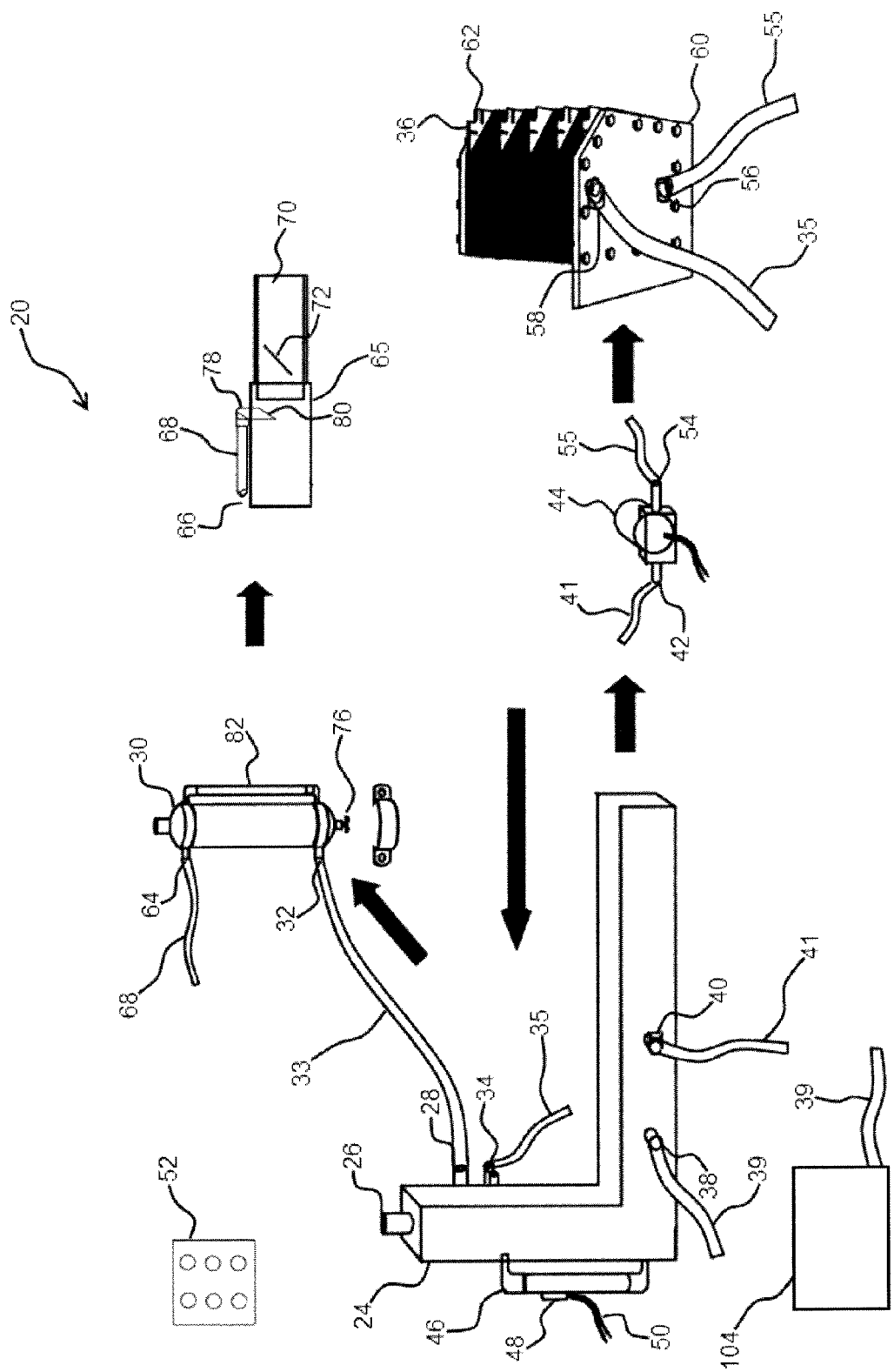
FIG. 1 is a highly schematic view of the improved combustion engine air supply system, in one form.

In order to provide a sufficient amount of hydrogen and oxygen gas in a dry cell environment, the combustion engine air supply system 20, as shown in FIG. 1, comprises a plurality of interoperating parts in one embodiment. While the fluid system substantially comprises a recycling system, we will begin with a description of the electrolyte stabilization tank 24, which includes a chemical solution fill tube and safety relief diaphragm 26, and an HHO gas outlet 28, which is coupled by way of a piece of tubing 33 to a scrubber 30, such as by way of an HHO inlet 32. The electrolyte stabilization tank 24 may further comprise at least one HHO inlet 34, also coupled by way of a section of tubing 35 to a hydrogen generator 36, which will be described in some detail. Furthermore, the electrolyte stabilization tank 24 comprises a water supply inlet 38 coupled by way of a section of tubing to an electrolyte stabilization pump. Furthermore, a water supply outlet 40 may be provided, which couples by way of a section of tubing 41 to a water supply inlet 42 on an energy HHO circulation pump 44. To allow for determination of the volume of fluid within the electrolyte stabilization tank 24, a sight glass 46 or equivalent measuring apparatus may be utilized. A fill switch 48 may also be utilized, which includes signal wires 50 that are coupled, in one form, to an electronic control box 52, which controls the electrolyte stabilization pump and other controls and devices. Grounding the stabilization tank had been found to eliminate a negative build-up of electric charge within the tank, increasing the overall effectiveness of the apparatus.

The HHO circulation pump 44 not only comprises the water supply inlet 42, but also comprises a water supply outlet 54, which couples by way of a section of tubing 55 to a water supply inlet 56 of the hydrogen generator 36. The hydrogen generator 36 also comprises a hydrogen product supply outlet 58, which is coupled by way of a section of tubing to the HHO inlet 34 on the electrolyte stabilization tank 24. These inlets 56 and outlets 58 may be formed on both the first side and second side 62 of the hydrogen generator 36.

The HHO scrubber unit 30 comprises the HHO inlet 32 as well as an HHO outlet 64, which couples by way of a length of tubing 68 to an HHO inlet 66 of the feed injector 78, which in one form is in line between an automotive air cleaner and a throttle body 70, so as to provide the HHO gas from the scrubber unit 30 to the combustion chambers of the internal combustion engine. In one form, the throttle body 70 comprises a throttle plate 72, which controls the throttle position sensor (TPS), which regulates the pulse width of the wave signal controlling the hydrogen generator 36. In this form, a pulse wave modulator (PWM) may be utilized to provide the correct waveform to the hydrogen generator 36. In this embodiment, as the throttle is opened wider, a signal is sent to the hydrogen generator 36 to produce more HHO gas which is delivered to the feed injector 78.

In another form, a Hall effect sensor is coupled to the fuel injector input. The output from the Hall effect sensor is then used to regulate the pulse width of the wave signal controlling the hydrogen generator 36. At idle, the positive portion of the wave sent to the injector will be quite short in duration, and when power is applied the engine, the positive portion of the wave will be considerably longer. The fuel injector signal therefore defines the power/control signal sent to the hydrogen generator either directly to the anode/cathode or to the control box 52, which in turn powers the hydrogen generator 36. While many common Hall effect sensors will not be capable of surviving the heat generated by an internal combustion engine, Hall effect sensors built for industrial or military use are normally capable of handling such environments.

In one form, the electrolyte stabilization tank 24 contains a chemical solution, which is pumped out from the water supply outlet 40 through the hydrogen generator 36 to release the HHO gas. The HHO gas released by the hydrogen generator 36 and any remaining liquid therein is then returned to the stabilization tank 24 through the supply outlet 58 to the inlet 34.

For optimum performance, the HHO inlet 34 is above the normal operating fluid level in the stabilization tank 24. As the HHO gas outlet 28 is vertically above the HHO inlet 34, the electrolyte fluid is thus returned to the stabilization tank 24 and the HHO gas can be withdrawn therefrom. As previously mentioned, the liquid level is maintained by the electrolyte fill switch 48, which in turn operates the electrolyte stabilization pump, which maintains the proper electrolyte level in the stabilization tank 24 by pumping in water as needed. As with most electrolysis systems, distilled water may be preferred.

The automatic fill system comprises the fill switch 48, control box 52, and electrolyte stabilization pump, and it maintains the chemical electrolyte at the desired concentration. As the system is in operation, the water is consumed in the gas making process; however, the electrolyte chemicals are not consumed in the gas making process and generally cycle between the stabilization tank 24 and the hydrogen generator 36. This system provides a stabilized reservoir for the chemical solution. The hydrogen and oxygen (HHO) produced in the hydrogen generator 36 and reentering the stabilization tank 24 are heated through the electrolysis process. In order to maintain temperature stability, the oxygen gas coming in contact with the stainless steel headspace in the stabilization tank 24 chills the stainless steel body of the stabilization tank 24, thus maintaining a low temperature for both the electrolyte fluid and the gas itself. This refrigeration effect helps to maintain the lower temperature at which the air supply system 20 is designed to function. The lowered temperature is conducive to combustion, thus resulting in increased power supply to the internal combustion engine.

The HHO circulation pump 44, in one form, is a diaphragm-style pump that maintains pressure when the air supply system 20 is engaged. In one form, the constant positive pressure of up to 24 PSI is maintained between the circulation pump 44 and the feed injector 78. In one form, if and when the maximum output pressure of the circulation pump 44 is reached, such as by an occlusion of the line, the circulation pump 44 will turn off. During use, a very low pressure differential will be maintained to enable flow of the fluid between the circulation pump 44 and the feed injector 78. The circulation pump 44 draws the electrolyte from the electrolyte stabilization tank 24, forcing it through the hydrogen generator 36, which causes the electrolyte and gas to flow back into the stabilization tank 24, where the gas and liquid are then separated. This constant flow prevents the accumulation of contaminants and chemicals on the generator plates shown in FIG. 3.

Figure 2:
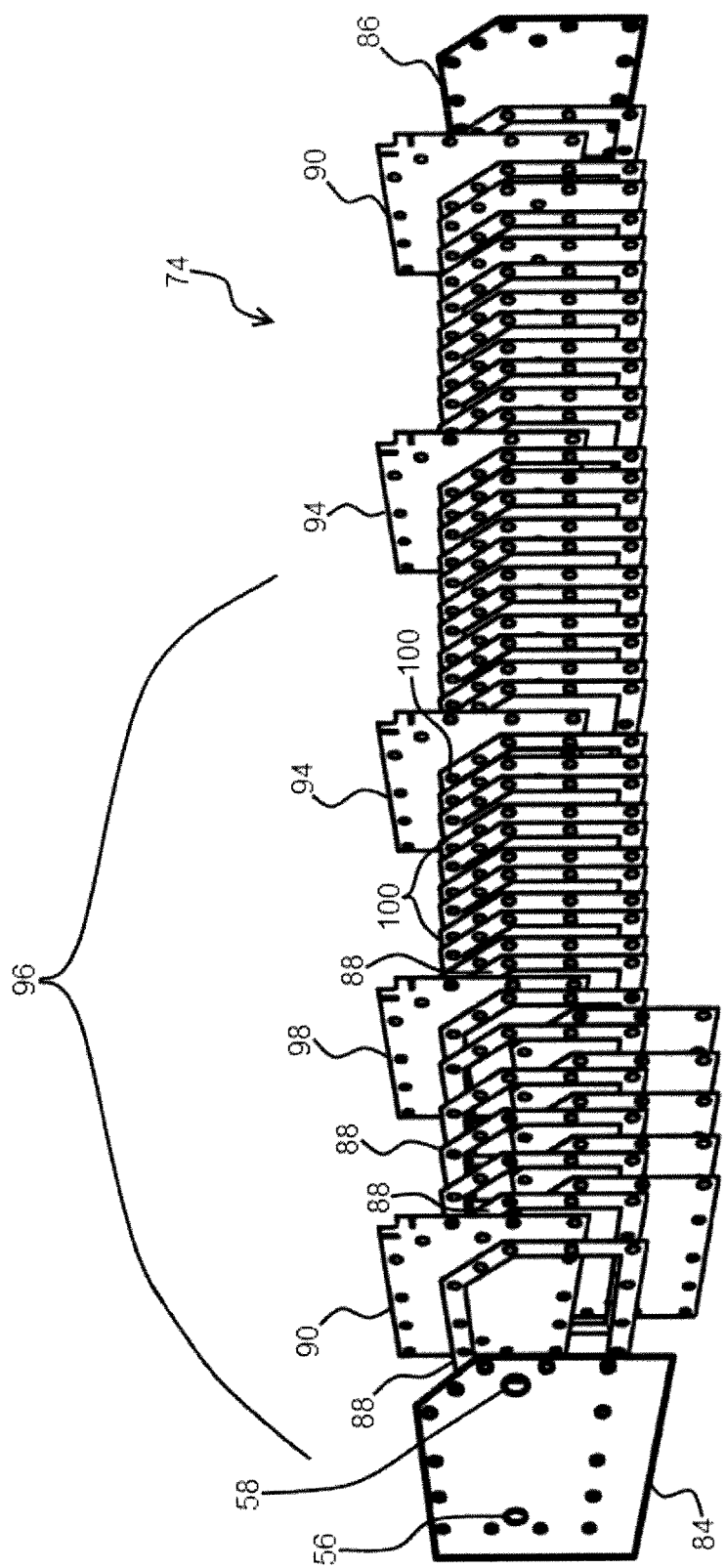
FIG. 2 is an exploded view of the HHO generator, in one form.
Figure 3:
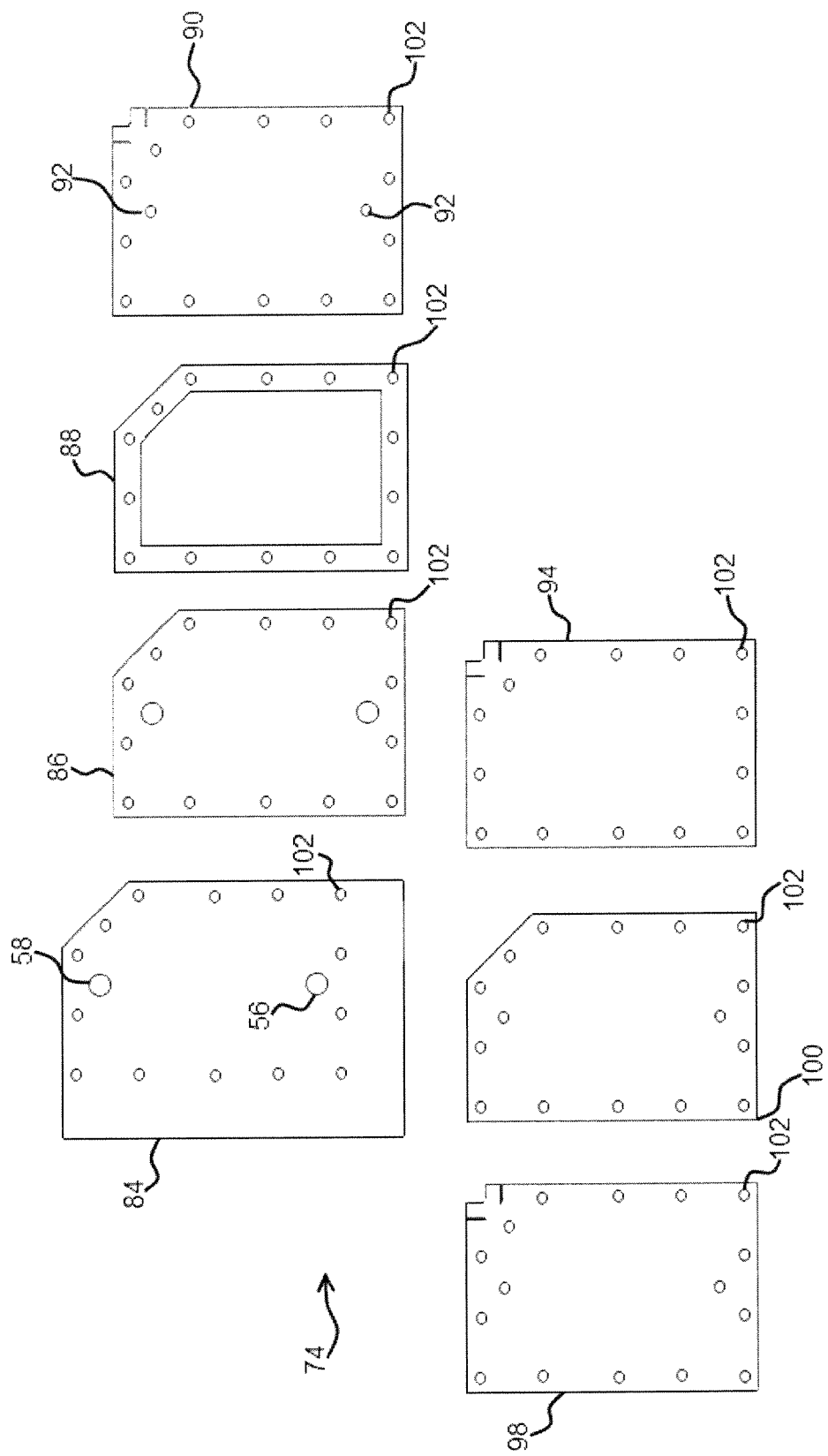
FIG. 3 is a view of the components of the HHO generator, in one form.

Operation of the air supply system 20 is facilitated by the above-described fluid flow, which moves the gas bubbles off of the generator plates 74, shown in FIGS. 2 and 3. This removal of the gas bubbles is accomplished as quickly as they are formed, thus increasing the cell efficiency of the hydrogen generator 36. Production is also improved by cooling the liquid electrolyte stabilizing production fluctuations due to temperature changes within the system. As previously described, this cooling is accomplished by contact of the oxygen gas being discharged into the stainless steel headspace of the electrolyte stabilization tank 26, causing an oxygen-to-stainless-steel reaction referred to as an element refrigeration action.

The common term fluid is used herein to define gasses, liquids, and combinations thereof.

This described constant flow through the system ensures a constant stirring action of the fluid flow, such that the chemicals are well mixed with the water being added by the chemical stabilization pump. The scrubber 30 is designed to protect the appliance/internal combustion engine from damage caused from actual droplets of liquid, should the gas-creating equipment for some reason become overfilled in the stabilization tank 24, or some other malfunction occur.

Another sight glass 82 provides visual observation should liquid accumulate in the scrubber. A petcock 76 may be provided near the lower end of the sight glass, through which the sight glass is easily emptied.

The input 66 comprises a delivery siphon or feed injector 78, which in one form comprises a 90° hose barb fitting with one portion tapered 80, as shown in FIG. 1. The siphon 78 is inserted into the engine air intake system 65 as previously described, allowing the engine vacuum to draw the HHO gas through the tube leading from the gas scrubber outlet 64, thus decreasing any potential pressure in the entire gas production system. Utilizing the vacuum pressure of the engine lowers the overall vapor pressure, which then allows for a significant increase in gas production.

As shown in FIG. 2, the hydrogen generator 36 comprises a plurality of plates 74, including at least one front cover plate 84, which includes the inlet 56 and outlet 58, as previously described. A back cover plate 86 is also included, as well as a plurality of gaskets 88. In one form, the cover plate 84, back plate 86, and gaskets 88 are formed of a non-conductive, hydrophilic material. Testing has shown that the commercial product Polyoxymethylene (Delrin) is exemplary for construction of the cover plate 84 and back plate 86. Prior applications using insulating materials that were not hydrophilic absorbed a small volume of water/catalyst and deformed after extended use. While only a few of the gaskets 88 are labeled in FIG. 2, it can be appreciated that in most embodiments every other layer of the plates 74 will be a gasket 88 to ensure fluid retention. At least one cathode 90 will also be utilized. Where it is desired to have the fluid electrolyte pass through the cathode 90, a plurality of water (fluid) ports 92 will be included, as shown in FIG. 3. The fluid ports 92 allow fluid to travel between one HHO generator cell 96 and another. At least one cathode 94 may also be used, which may not include a fluid port where it is not desired to allow the fluid to flow between adjacent HHO generator cells. Each HHO generator cell 96 will also include at least one anode 98. The use of anodes and cathodes is commonly known in the art of HHO generation. To increase the volume of each HHO generator cell 96, a plurality of neutral plates 100 may also be included. As shown and previously described, each of the plates 74 will have a gasket 88 therebetween. To ease in manufacture of the hydrogen generator 36, each of the plates and gaskets may include a plurality of voids 102 through which a plurality of fasteners, such as (stainless steel) bolts, may be passed. By tensioning nuts onto these bolts, the entire hydrogen generator 36 is drawn together, compressing the gaskets 88 into the final, fluid-tight form.

As with any other electrolysis system, electric voltage is applied between the anodes and the associated cathodes. In one form, the voltage is applied as a monopole square wave into a resonant circuit which is tuned to the specific solution used as an electrolyte.

In one embodiment, a water reservoir 104 is fluidly coupled to the electrolyte stabilization tank through conduit 39 so as to maintain the fluid level within the electrolyte stabilization tank. The fill switch 48 may be coupled to a pump or valve between the water reservoir 104 and the electrolyte stabilization tank so as to allow water to flow into the electrolyte stabilization tank when the volume drops below a preset limit.

Testing has shown that marine grade, 316L stainless steel exhibits substantially better production and corrosion resistance than other tested materials.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. An HHO generating electrolysis system comprising:
   a. a grounded, stainless steel electrolyte stabilization tank which in turn comprises:
      i. a reservoir containing a volume of electrolyte;
      ii. catalytic chemicals within the electrolyte to substantially increase the oxygen and hydrogen production of the electrolysis system;
      iii. an enclosed fluid pathway from the electrolyte stabilization tank to the air supply of an internal combustion engine
   b. a hydrogen generator comprising:
      i. a fluid conduit providing fluid communication to the electrolyte stabilization tank;
      ii. a volume of electrolyte fluid within the hydrogen generator;
      iii. at least one anode plate having surfaces defining a plurality of fluid ports there through;
      iv. each of the at least one anode plate having edges not exposed to the electrolyte;
      v. at least one cathode plate having surfaces defining a plurality of fluid ports there through;
      vi. each of the at least one cathode plate having edges not exposed to the electrolyte;
      vii. a fluid holding space between each anode plate and each cathode plate,
      viii. an electric power coupling between a power providing system and each anode plate as well as each cathode plate;
   c. an electronic control providing electric power to each anode plate and each cathode plate;
   d. a throttle position sensor coupled to the throttle position of a throttle of an attached combustion device; and
   e. wherein the electronic control is configured to apply electric power between the at least one anode and the at least one cathode as a monopole square wave, actively tuned to the throttle position sensor coupled to the throttle position of the throttle of the attached combustion device.

2. The HHO generating electrolysis system as recited in claim 1 further comprising a pulse wave modulator configured to adjust the waveform of the power provided to the electric power coupling of the hydrogen generator.

3. The HHO generating electrolysis system as recited in claim 1 wherein at least the upper portion of the electrolyte stabilization tank comprises a stainless steel portion in physical contact with the oxygen produced from the hydrogen generator so as to chemically (catalytically) react therewith and reduce the temperature therein.

4. The HHO generating electrolysis system as recited in claim 1 further comprising a mechanical HHO circulation pump in-line between the electrolyte stabilization tank and the hydrogen generator configured to circulate fluid therebetween.

5. The HHO generating electrolysis system as recited in claim 1 further comprising a scrubber between the electrolyte stabilization tank and the combustion engine air supply system configured to separate liquid from gas wherein the gas is injected into the combustion engine air supply system.

6. The HHO generating electrolysis system as recited in claim 1 further comprising a water reservoir fluidly coupled to the electrolyte stabilization tank via a length of tubing, the water reservoir configured to maintain the fluid level within the electrolyte stabilization tank.

7. The HHO generating electrolysis system as recited in claim 1 wherein the catalyst is selected from the list consisting of:
   a. Potassium Hydroxide, and
   b. Boric Acid.

8. The HHO generating electrolysis system as recited in claim 1 wherein:
   a. the HHO generating electrolysis system comprises an HHO outlet in fluid communication with the fresh air intake of a combustion device; and
   b. wherein the electronic control is configured to be actively tuned to the airflow through the air intake of the attached combustion device.

9. An HHO generating electrolysis system comprising:
   a. a grounded, L-shaped stainless steel electrolyte stabilization tank having a horizontal leg and a vertical leg;
   b. the stabilization tank in turn comprising:
      i. a reservoir containing a volume of electrolyte;
      ii. catalytic chemicals within the electrolyte to substantially increase the oxygen and hydrogen production of the electrolysis system;
      iii. an enclosed fluid pathway from the electrolyte stabilization tank to the air supply of an internal combustion engine
   c. a dry cell hydrogen generator thermally isolated from and in fluid communication with the electrolyte stabilization tank; the hydrogen generator comprising:
      i. a fluid conduit providing fluid communication to the electrolyte stabilization tank at a position in the vertical leg above the operating fluid level of the stabilization tank;
      ii. a volume of electrolyte fluid within the hydrogen generator;
      iii. at least one anode plate having edges not exposed to the electrolyte;

iv. at least one cathode plate having edges not exposed to the electrolyte;
v. a fluid holding space between each anode plate and each cathode plate,
vi. an electric power coupling between a power providing system and each anode plate as well as each cathode plate;
d. an electronic control providing power to each of the at least one anode plate and each of the at least one cathode plate;
e. a pulse wave modulator electrically connected to and configured to adjust the power provided to each of the at least one anode plate and each of the at least one cathode plate as a square wave; and
f. a mechanical HHO circulation pump positioned in-line between the electrolyte stabilization tank and the hydrogen generator configured to circulate fluid therebetween.

* * * * *